US012057043B2

(12) United States Patent
Yang et al.

(10) Patent No.: US 12,057,043 B2
(45) Date of Patent: Aug. 6, 2024

(54) DISPLAY PANEL, METHOD FOR DETECTING CRACK, AND DISPLAY APPARATUS

(71) Applicant: WUHAN TIANMA MICRO-ELECTRONICS CO., LTD., Wuhan (CN)

(72) Inventors: Chunhui Yang, Wuhan (CN); Kang Yang, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/303,304

(22) Filed: Apr. 19, 2023

(65) Prior Publication Data

US 2023/0252925 A1 Aug. 10, 2023

(30) Foreign Application Priority Data

Nov. 17, 2022 (CN) ........................ 202211439306.8

(51) Int. Cl.
*G09G 3/00* (2006.01)

(52) U.S. Cl.
CPC ......... *G09G 3/006* (2013.01); *G09G 2330/12* (2013.01)

(58) Field of Classification Search
CPC ....... G09G 2300/0426; G09G 2330/12; G09G 3/006
See application file for complete search history.

(56) References Cited

U.S. PATENT DOCUMENTS

| | | | | |
|---|---|---|---|---|
| 10,948,535 B2 * | 3/2021 | Zhao | H10K 59/35 |
| 11,107,869 B2 * | 8/2021 | Lee | H01L 27/124 |
| 11,373,559 B2 * | 6/2022 | Zhao | H01L 23/5386 |
| 2013/0083457 A1 * | 4/2013 | Wurzel | G02F 1/1309 700/109 |
| 2016/0232826 A1 * | 8/2016 | Cho | G09G 3/20 |
| 2018/0053792 A1 * | 2/2018 | Shin | H01L 27/1244 |
| 2018/0090517 A1 * | 3/2018 | Park | H01L 27/1248 |
| 2018/0158741 A1 * | 6/2018 | Kim | H01L 22/32 |
| 2018/0174505 A1 * | 6/2018 | Mandlik | G09G 3/035 |
| 2019/0165312 A1 * | 5/2019 | Bae | G09G 3/3225 |
| 2020/0066196 A1 * | 2/2020 | Hao | H10K 71/70 |
| 2020/0203236 A1 * | 6/2020 | Lee | G01R 31/2884 |
| 2020/0388664 A1 * | 12/2020 | Cheng | G09G 3/20 |
| 2021/0118344 A1 * | 4/2021 | Kim | G09G 3/3266 |
| 2021/0175463 A1 * | 6/2021 | Zhou | G09G 3/006 |

(Continued)

FOREIGN PATENT DOCUMENTS

| | | | |
|---|---|---|---|
| CN | 108831362 A | | 11/2018 |
| CN | 112259587 A | | 1/2021 |
| CN | 108831362 | * | 11/2022 |

*Primary Examiner* — Kenneth Bukowski
(74) *Attorney, Agent, or Firm* — CHRISTENSEN O'CONNOR JOHNSON KINDNESS PLLC

(57) ABSTRACT

Provided are a display panel, a crack detection method, and a display apparatus. The display panel has a display area and a non-display area surrounding the display area. The display panel includes a crack detection line located in the non-display area. The crack detection line includes a main detection line and at least one auxiliary detection line. The auxiliary detection line includes a first end and a second end each being connected to the main detection line.

15 Claims, 14 Drawing Sheets

(56) References Cited

U.S. PATENT DOCUMENTS

| | | | | |
|---|---|---|---|---|
| 2021/0335974 | A1 * | 10/2021 | Zhou | G09G 3/00 |
| 2022/0005384 | A1 * | 1/2022 | Zhao | G09F 9/301 |
| 2022/0254285 | A1 * | 8/2022 | Wang | H10K 71/70 |
| 2023/0245605 | A1 * | 8/2023 | Oh | G09G 3/006<br>345/694 |

* cited by examiner

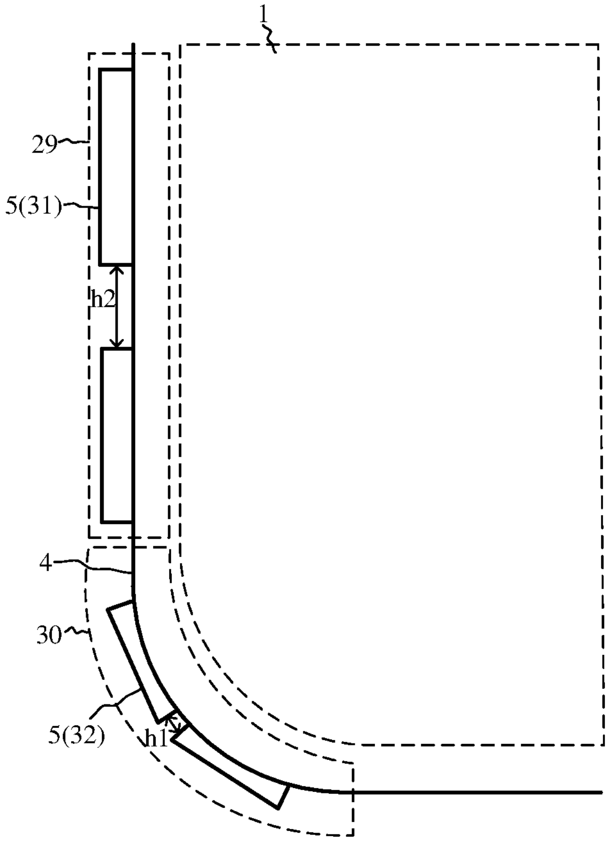

FIG. 23

S1 — Acquire a first preset resistance, where the first preset resistance is a resistance of the crack detection line when the auxiliary detection line or a main segment of the main detection line is broken, where the main wiring segment is a portion of the main detection line connected in parallel to the auxiliary detection line S2 — Detect an actual resistance of the crack detection line and determine whether the actual resistance corresponds to the first preset resistance, and in response to determining that the actual resistance corresponds to the first preset resistance determine the display panel has a crack, and the crack is located on the auxiliary detection line or the main detection line

FIG. 24

DISPLAY PANEL, METHOD FOR DETECTING CRACK, AND DISPLAY APPARATUS

CROSS-REFERENCE TO RELATED DISCLOSURE

The present disclosure claims priority to Chinese Patent Application No. 202211439306.8, filed on Nov. 17, 2022, the content of which is incorporated herein by reference in its entirety.

TECHNICAL FIELD

The present disclosure relates to the field of display technologies, and, particularly, relates to a display panel, a method for detecting crack of the display panel, and a display apparatus.

BACKGROUND

During the manufacturing process of a display panel, an edge of the display panel is easily damaged by cracks. The crack extends inward from the edge, causes breakage of metal wiring in the display panel, and adversely affects the normal display of the display panel. Especially, a flexible display panel is more likely to generate cracks due to its flexible characteristics.

However, the existing crack detection can only determine whether the display panel has cracks, and cannot determine the position of crack, so that it is difficult to confirm process capability and perform subsequent process analysis.

SUMMARY

A first aspect of the present disclosure provides a display panel. The display panel has a display area and a non-display area, and includes a crack detection line located in the non-display area. The crack detection line includes a main detection line and at least one auxiliary detection line, the non-display area surrounds the display area, each of the at least one auxiliary detection line includes a first end and a second end each being connected to the main detection line.

A second aspect of the present disclosure provides a crack detection method of the display panel described above. The crack detection method includes acquiring a first preset resistance, where the first preset resistance is a resistance of the crack detection line when the at least one auxiliary detection line or a main segment is broken, and the main segment is a portion of the main detection line connected in parallel to the auxiliary detection line; detecting an actual resistance of the crack detection line and determining whether the actual resistance corresponds to the first preset resistance; and if the actual resistance corresponds to the first preset resistance, determining that the display panel has the crack, and the crack is located on the at least one auxiliary detection line or the main detection line.

A third aspect of the present disclosure provides the display apparatus including the display panel described above.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

FIG. 23 is a partial schematic diagram of a display panel according to an embodiment of the present disclosure;

FIG. 24 is a flow chart of a crack detection method according to an embodiment of the present disclosure;

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiment, rather than limiting the present disclosure. The terms “a”, “an”, “the” and “said” in a singular form in the embodiment of the present disclosure and the attached claims are also intended to include plural forms thereof, unless noted otherwise.

It should be understood that the term “and/or” used in the context of the present disclosure is to describe a correlation relation of related objects, indicating that there can be three relations, e.g., A and/or B can indicate only A, both A and B, and only B. In addition, the symbol “/” in the context generally indicates that the relation between the objects in front and at the back of “/” is an “or” relationship.

Figure 1:
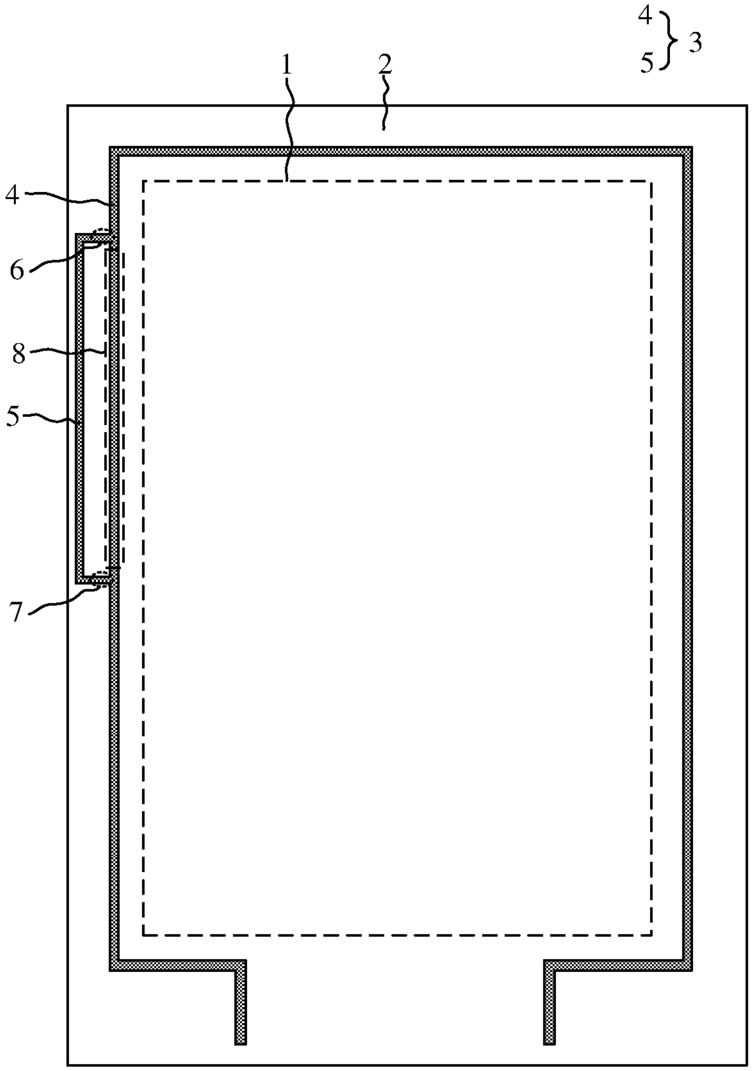
FIG. 1 is a top view of a display panel according to an embodiment of the present disclosure.
Figure 2:
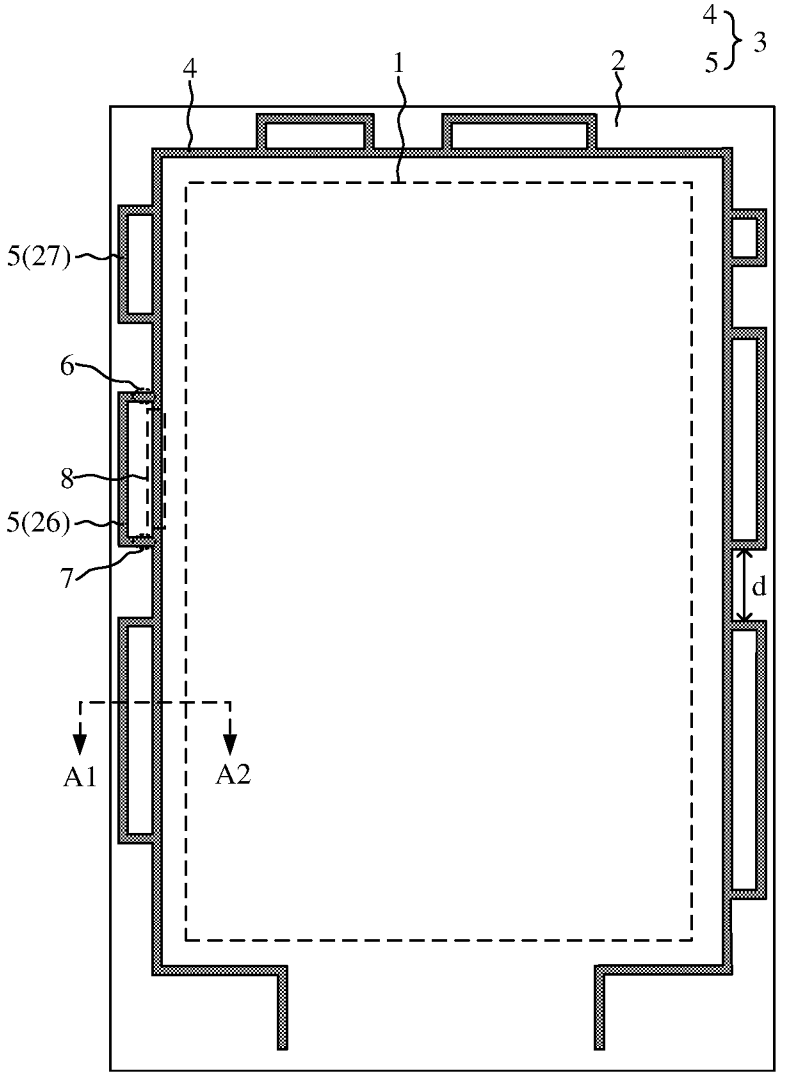
FIG. 2 is a top view of a display panel according to another embodiment of the present disclosure.

The present disclosure provides a display panel. FIG. 1 is a top view of a display panel according to an embodiment of the present disclosure; and FIG. 2 is a top view of a display panel according to another embodiment of the present disclosure. As shown in FIG. 1 and FIG. 2, the display panel includes a display area 1, a non-display area 2 and a crack detection line 3 located in the non-display area 2. The crack detection line 3 includes a main detection line 4 and at least one auxiliary detection line 5.

The main detection line 4 surrounds the display area 1. For example, the main detection line 4 may non-closely surround the display area 1. The main detection line 4 stops at an area at a lower frame to facilitate wiring design of the lower frame. The auxiliary detection line 5 includes a first end 6 and a second end 7. Each of the first end 6 and the second end 7 is connected to the main detection line 4. Specifically, the first end 6 and the second end 7 are connected to different positions of the main detection line 4, respectively.

In the related art, the crack detection line in the display panel only includes the main detection line surrounding the display area. In such a structure, no matter which position generates cracks, the crack detection line will be disconnected, so that its resistance will become unlimited. Therefore, during crack detection, it can only determine whether the display panel generates a crack according to the resistance of the crack detection line, but it cannot determine the position of crack.

In the present disclosure, the auxiliary detection line 5 is provided, and the auxiliary detection line 5 is electrically connected to the main detection line 4, so that the auxiliary detection line 5 and a main segment 8 of the main detection line 4 are connected in parallel and form a parallel structure. Even if the auxiliary detection line 5 or the main segment 8 in the parallel structure is broken (disconnected), the crack detection line 3 as a whole is still conductive.

Based on the above structure, an overall resistance of the crack detection line 3 when the auxiliary detection line 5 and the main segment 8 in the parallel structure are not broken, is different from an overall resistance of the crack detection line 3 when the auxiliary detection line 5 or the main segment 8 in the parallel structure is broken, so that according to the difference in resistance, whether the auxiliary detection line 5 or the main segment 8 is broken under the action of crack can be determined. For example, a first preset resistance of the crack detection line 3 when the auxiliary detection line 5 or the main segment 8 in the parallel structure is broken can be calculated in advance. An actual resistance of the crack detection line 3 is measured. If the actual resistance matches the first preset resistance, it indicates that the auxiliary detection line 5 or the main segment 8 in the parallel structure is broken, so that the position of the parallel structure is a crack generation position, thereby achieving accurate determination of the crack generation position. In this way, process capability and subsequent process analysis can be determined based on the crack generation position, which is conductive to improving and repairing the display panel.

Moreover, in some embodiments of the present disclosure, during crack detecting, it is only needed to acquire the actual resistance of the crack detection line 3 without operations such as lighting the screen and disposing a position detector in the display panel, etc., so that the detection manner is simpler and has a low detection cost.

In addition, in some embodiments of the present disclosure, referring to FIG. 1, the crack detection line 3 may include only one auxiliary detection line 5. For example, the one auxiliary detection line 5 is provided at the position where cracks are most likely to occur, so that key monitoring of this position is performed. Alternatively, referring to FIG. 2, the crack detection line 3 may include multiple auxiliary detection lines 5 to form multiple detection positions, thereby achieving a more accurate determination of the crack generation position.

In some embodiments, referring to FIG. 1 and FIG. 2, the auxiliary detection line 5 is located at a side of the main detection line 4 away from the display area 1.

Since cracks are mostly generated at an edge of the display panel and extend from the edge of the display panel to the middle of the display panel, when the auxiliary detection line 5 is located at a side of the main detection line 4 adjacent to the edge of the display panel, the auxiliary detection line 5 is more likely broken due to the cracks than the main detection line 4. That means the above structure detects the crack generation position based on whether the auxiliary detection line 5 is broken.

When the crack detection line 3 includes multiple auxiliary detection lines 5, multiple auxiliary detection lines 5 can be arranged at intervals along an extending direction of the main detection line 4. The resistances of different auxiliary detection lines 5 can be different. At this time, the resistances of different auxiliary detection lines 5 have different influence on the overall resistance of the crack detection line 3, so that the resistance of crack detection line 3 varies when different auxiliary detection lines 5 are broken.

As shown in FIG. 1 and FIG. 2, the display panel includes a left edge, a right edge, an upper edge, and a lower edge. In some embodiments, the main detection line 4 extends along the left edge, the upper edge and the right edge sequentially. Two ends of the main detection line 4 are provided in a region adjacent to the lower edge. The region adjacent to the lower edge may be a pad region.

In some embodiments, the display panel may include two or more crack detection lines 3. One crack detection line 3 extends along the left edge and the upper edge to the right corner of the display panel, and then extends back along the upper edge and the left edge. Another crack detection line 3 extends forth-and-back along the right edge.

In some embodiments, the play panel may include two or more crack detection lines 3. One crack detection line 3 extends along the left edge and the upper edge to the middle of the upper area of the non-display area 2, and then extends back along the upper edge and the left edge. Another crack detection line 3 extends along the right edge and the upper edge to the middle of the upper area of the non-display area 2, and then extends back along the upper edge and the right edge.

In some embodiments, the crack detection line 3 includes x auxiliary detection lines 5, and the first preset resistance includes resistance values corresponding to conditions of an i-th auxiliary detection line being broken, where i is 1, 2, . . . , or x. That means the first preset resistance includes x resistance values. If the detected actual resistance corresponds to one of the x resistance values, which one of the x auxiliary detection lines 5 is broken due to the crack can be determined. Since the x auxiliary detection lines 5 are disposed at different positions, the crack position can be determined accordingly.

In some embodiments, a configuration capable of determining two or more crack positions is provided. The crack detection line 3 includes a first auxiliary detection line and a second auxiliary detection line. The first preset resistance includes: a first resistance corresponding to a condition the first auxiliary detection line is broken, a second resistance corresponding to a condition the second auxiliary detection line is broken, and a third resistance corresponding to a condition the first auxiliary detection line and the second auxiliary detection line are both broken. The first resistance, the second resistance, and the third resistance are calculated in advance.

For example, the crack detection line 3 includes x auxiliary detection lines 5, and the first preset resistance is a set of N resistance values, where $N=C_X^1+C_X^2+ . . . +C_X^X$. C denotes a combination number formula. For example, $C_X^1=x$, $C_X^X=1$. That means the first preset resistance includes the resistance of the crack detection line 3 when any i auxiliary detection lines 5 are broken, where i is 1, 2, 3, . . . , x.

In this way, when the detected actual resistance corresponds to one of the $C_X^1$ resistance values, it is determined that one of the x auxiliary detection lines 5 is broken, and which one of the x auxiliary detection lines 5 can also be determined. When the detected actual resistance corresponds one of the $C_X^2$ resistance values, it is determined that two of the x auxiliary detection lines 5 are broken, and which two of the x auxiliary detection lines 5 can also be determined . . . . When the detected actual resistance corresponds to the one resistance value representing all the x auxiliary detection lines 5 are broken, it is determined that all the x auxiliary detection lines 5 are broken.

Taking x=3 as an example, the first preset resistance can include: a resistance of the crack detection line 3 when a first auxiliary detection line 5 is broken, a resistance of the crack detection line 3 when a second auxiliary detection line 5 is broken, a resistance of the crack detection line 3 when a third auxiliary detection line 5 is broken, a resistance of the crack detection line 3 when the first auxiliary detection line 5 and the second auxiliary detection line 5 are broken, a resistance of the crack detection line 3 when the second auxiliary detection line 5 and the third auxiliary detection line 5 are broken, a resistance of the crack detection line 3 when the first auxiliary detection line 5 and the third auxiliary detection line 5 are broken, and a resistance of the crack detection line 3 when the three auxiliary detection lines 5 are broken. During detecting cracks, by comparing a detected actual resistance of the crack detection line 3 with the first preset resistance calculated in advance, when the actual resistance corresponds to one of the first preset resistances, then it is determined that which one or more auxiliary detection lines 5 are broken according to the detected actual resistance, thereby further obtaining the crack generation position.

In some embodiments of the present disclosure, the auxiliary detection line 5 can be understood as an additional structure added to the main detection line 4. When detecting the crack generation position based on the breakage of the auxiliary detection line 5, only adjusting the resistances of different auxiliary detection lines 5 is required without changing design parameters of the main detection line 4. In this way, design parameters of the crack detection line 3 have a small adjustment degree, and its adjustment manner is more flexible.

Figure 3:
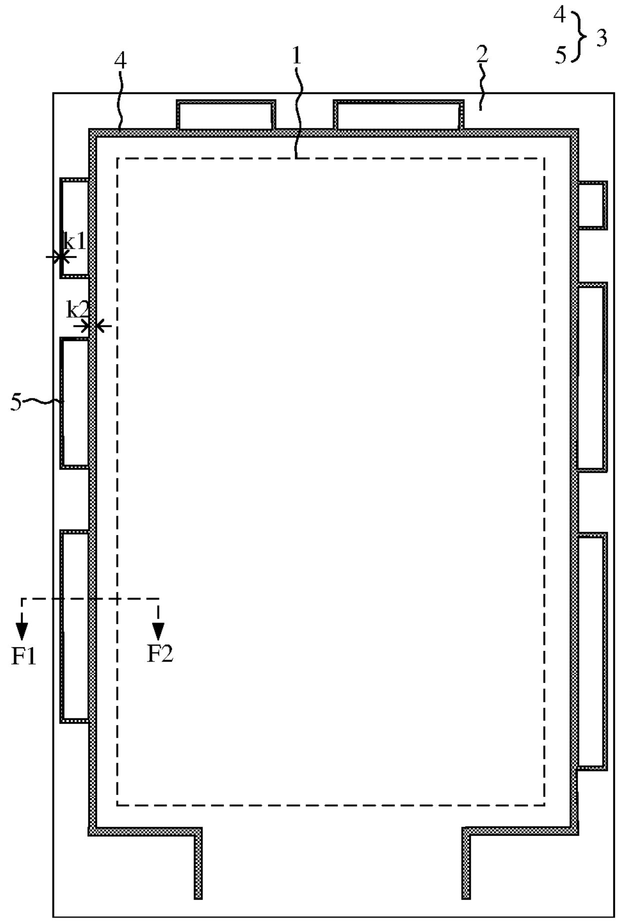
FIG. 3 is a top view of a display panel according to another embodiment of the present disclosure.

FIG. 3 is a top view of a display panel according to another embodiment of the present disclosure. In some embodiments, as shown in FIG. 3, a line width k1 of the auxiliary detection line 5 is smaller than or equal to a line width k2 of the main detection line 4. For example, in some embodiments of the present disclosure, the line width k1 of the auxiliary detection line 5 is smaller than the line width k2 of the main detection line 4.

The line width of the auxiliary detection line 5 refers to a width, perpendicular to the extending direction of the auxiliary detection line 5, of an orthographic projection, in a direction perpendicular to a plane of the display panel, of the auxiliary detection line 5. The width of the main detection line 4 refers to a width, perpendicular to the extending direction of the main detection line 4, of an orthographic projection, in a direction perpendicular to a plane of the display panel, of the main detection line 4.

In this setting manner, the auxiliary detection line 5 is relatively narrow. When the auxiliary detection line 5 is located at a side of the main detection line 4 adjacent to an edge of the display panel, the auxiliary detection line 5 is more likely to break under the action of cracks, so that the auxiliary detection line 5 is more sensitive to cracks, thereby achieving high accuracy of crack detection.

Figure 4:
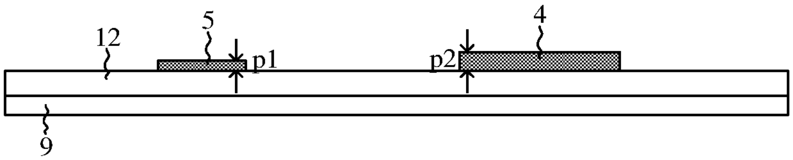
FIG. 4 is a cross-sectional view taken along line F1-F2 shown in FIG. 3 according to an embodiment of the present disclosure.

FIG. 4 is a cross-sectional view taken along line F1-F2 shown in FIG. 3 according to an embodiment of the present disclosure. In some embodiments of the present disclosure, as shown in FIG. 4, a thickness p1 of the auxiliary detection line 5 is smaller than a thickness p2 of the main detection line 4. With such configuration, the auxiliary detection line 5 is more easily to break under the action of cracks when the line width of the auxiliary detection line 5 is smaller than or equal to the line width of the main detection line 4, increasing the sensitivity of the auxiliary detection line 5 to cracks.

The thickness of the auxiliary detection line 5 refers to a thickness of the auxiliary detection line 5 in the direction perpendicular to the plane of the display panel. The thickness of the main detection line 4 refers to a thickness of the main detection line 4 in the direction perpendicular to the plane of the display panel.

Figure 5:
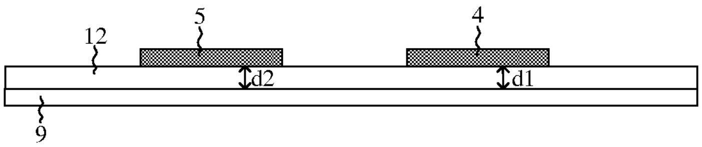
FIG. 5 is a cross-sectional view taken along line A1-A2 shown in FIG. 2 according to an embodiment of the present disclosure.
Figure 6:
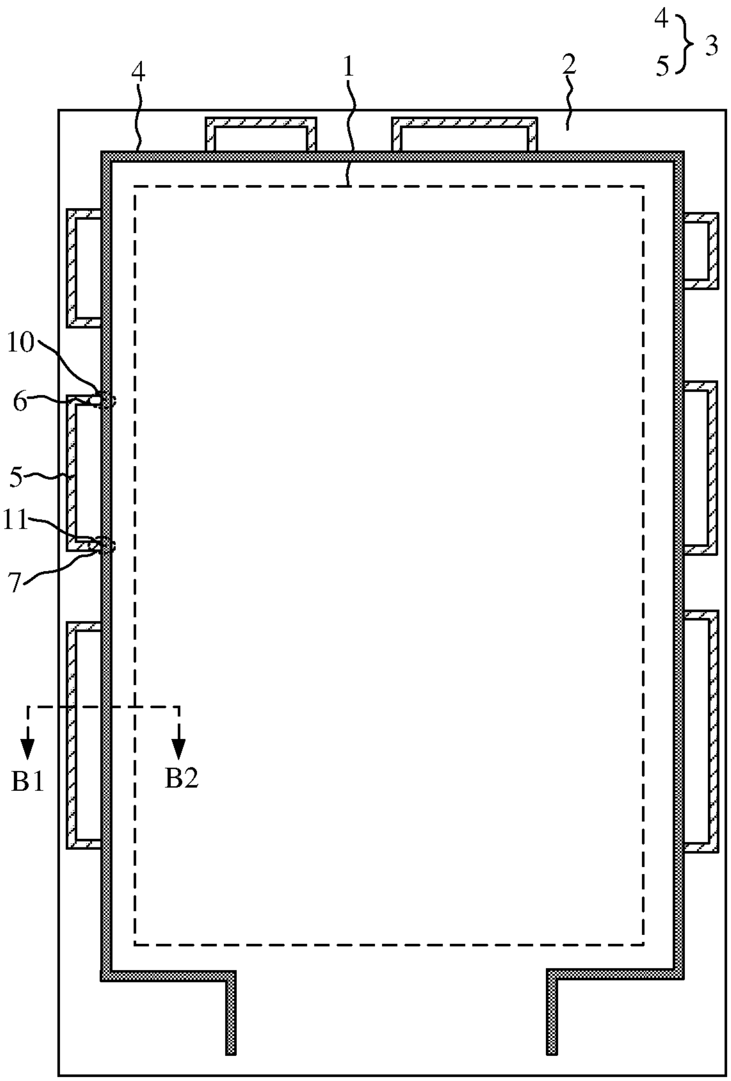
FIG. 6 is a top view of a display panel according to another embodiment of the present disclosure.
Figure 7:
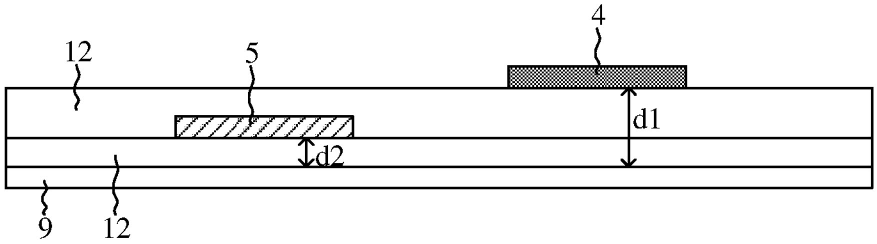
FIG. 7 is a cross-sectional view taken along line B1-B2 shown in FIG. 6 according to an embodiment of the present disclosure.

FIG. 5 is a cross-sectional view taken along line A1-A2 shown in FIG. 2 according to an embodiment of the present disclosure, FIG. 6 is a top view of a display panel according to another embodiment of the present disclosure, and FIG. 7 is a cross-sectional view taken along line B1-B2 shown in FIG. 6 according to an embodiment of the present disclosure. In some embodiments of the present disclosure, the display panel includes a substrate 9. Along a direction of perpendicular to a plane of the substrate 9, a distance d2 between the auxiliary detection line 5 and the substrate 9 is smaller than or equal to a distance d1 between the main detection line 4 and the substrate 9.

For example, in a setting manner of the present disclosure, referring to FIG. 5, the distance d2 between the auxiliary detection line 5 and the substrate 9 is equal to the distance d1 between the main detection line 4 and the substrate 9. At this time, the auxiliary detection line 5 and the main detection line 4 can be disposed in a same layer. In such a structure, the auxiliary detection line 5 and the main detection line 4 are spaced apart from the substrate 9 by at least one insulation layer 12.

In another setting manner of the present disclosure, referring to FIG. 6 and FIG. 7, the distance d2 between the auxiliary detection line 5 and the substrate 9 is smaller than the distance d1 between the main detection line 4 and the substrate 9. At this time, the auxiliary detection line 5 can be disposed in a layer different from the main detection line 4. A first end 6 of the auxiliary detection line 5 is connected to the main detection line 4 through a first via 10, and a second end 7 of the auxiliary detection line 5 is connected to the main detection line 4 through a second via 11. In such a structure, the auxiliary detection line 5 is spaced from the substrate 9 by at least one insulation layer 12. The auxiliary detection line 5 is spaced from the main detection line 4 by another at least one insulation layer 12.

In the above structure, when the distance between the auxiliary detection line 5 and the substrate 9 is small, especially when the distance between the auxiliary detection line 5 and the substrate 9 is smaller than the distance between the main detection line 4 and the substrate 9, the auxiliary detection line 5 is closer to the substrate 9. Because the cracks are mostly generated on the substrate 9, the auxiliary detection line 5 is more sensitive to the crack and then is more likely to break under the action of cracks. When the auxiliary detection line 5 is located at a side of the main detection line 4 adjacent to the edge of the display panel and the crack generation position is determined based on whether the auxiliary detection line 5 is broken, such a structure can improve the accuracy of crack detection.

Figure 8:
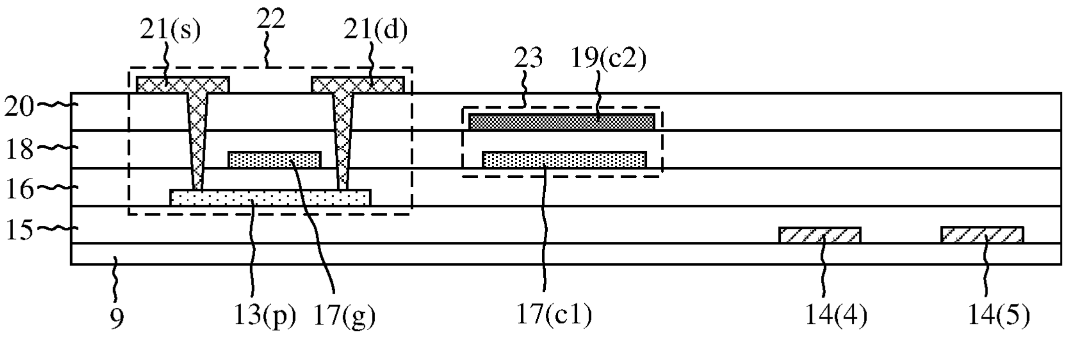
FIG. 8 is a schematic diagram showing layers of a main detection line and an auxiliary detection line according to an embodiment of the present disclosure.
Figure 9:
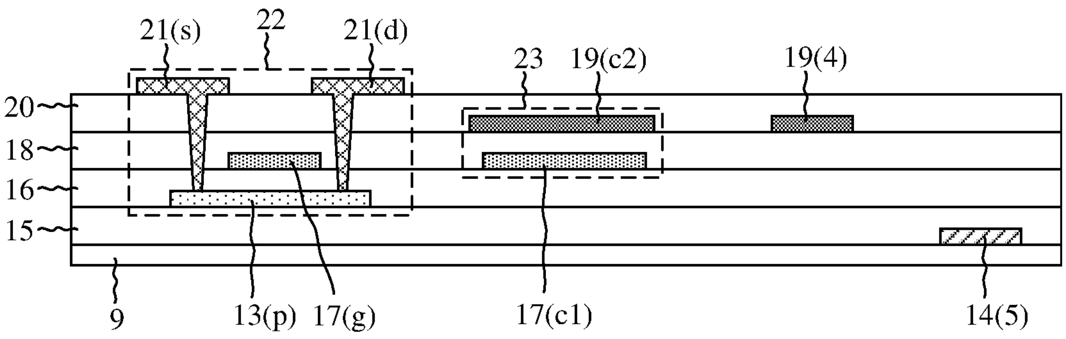
FIG. 9 is a schematic diagram showing layers of a main detection line and an auxiliary detection line according to another embodiment of the present disclosure.
Figure 10:
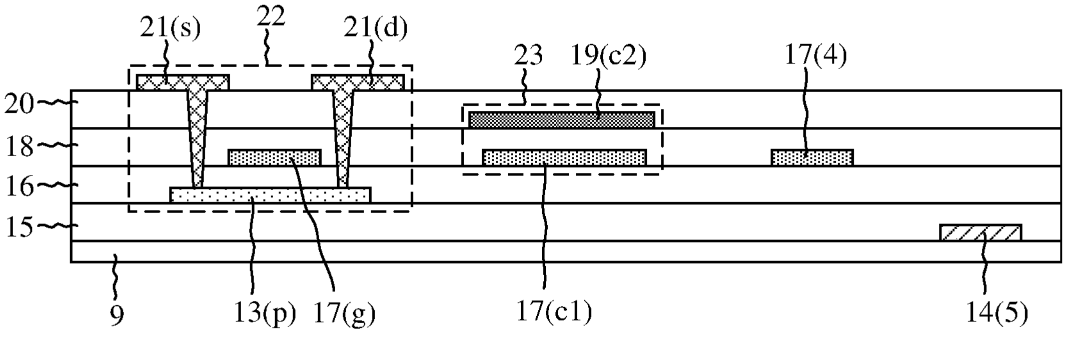
FIG. 10 is a schematic diagram showing layers of a main detection line and an auxiliary detection line according to another embodiment of the present disclosure.

FIG. 8 is a schematic diagram showing layers of a main detection line 4 and an auxiliary detection line 5 according to an embodiment of the present disclosure, FIG. 9 is a schematic diagram showing layers of a main detection line 4 and an auxiliary detection line 5 according to another embodiment of the present disclosure, and FIG. 10 is a schematic diagram showing layers of a main detection line 4 and an auxiliary detection line 5 according to another embodiment of the present disclosure. As shown in FIG. 8 to FIG. 10, the display panel further includes a semiconductor layer 13 and a first metal layer 14. The first metal layer 14 is located between the semiconductor layer 13 and the substrate 9. The auxiliary detection line 5 is located in the first metal layer 14. At this time, the auxiliary detection line 5 is located in a metal layer nearest to the substrate 9. Since the auxiliary detection line 5 is very close to the substrate 9, the auxiliary detection line 5 is even more sensitive to cracks.

In addition, referring to FIG. 8 and FIG. 9, the display panel further includes a buffer layer 15, a gate insulation layer 16, a second metal layer 17, a first interlayer insulation layer 18, a third metal layer 19, a second interlayer insulation layer 20, and a fourth metal layer 21. The buffer layer 15 is located between the first metal layer 14 and the semiconductor layer 13. The gate insulation layer 16 is located at a side of the semiconductor layer 13 facing away from the substrate 9. The second metal layer 17 is located at a side of the gate insulation layer 16 facing away from the substrate 9. The first interlayer insulation layer 18 is located at a side of the second metal layer 17 facing away from the substrate 9. The third metal layer 19 is located at a side of the first interlayer insulation layer 18 facing away from the substrate 9. The second interlayer insulation layer 20 is located at a side of the third metal layer 19 facing away from the substrate 9. The fourth metal layer 21 is located at a side of the second interlayer insulation layer 20 facing away from the substrate 9.

Referring to FIG. 8 and FIG. 9, the display panel further includes a transistor 22 and a storage capacitor 23. The semiconductor layer 13 includes an active layer p of the transistor 22. The second metal layer 17 includes a gate electrode g of the transistor 22 and a first electrode C1 of the storage capacitor 23. The third metal layer 19 includes a second electrode C2 of the storage capacitor 23. The fourth metal layer 21 includes a first electrode s and a second electrode d of the transistor 22.

In some embodiments of the present disclosure, the auxiliary detection line 5 can be located in one of the first metal layer 14, the second metal layer 17, the third metal layer 19 or the fourth metal layer 21. The main detection layer 4 can also be located in one of the first metal layer 14, the second metal layer 17, the third metal layer 19 or the fourth metal layer 21.

For example, when the auxiliary detection line 5 and the main detection line 4 are disposed in a same layer, in one setting manner, referring to FIG. 8, the auxiliary detection line 5 and the main detection line 4 are both located in the first metal layer 14.

Figure 11:
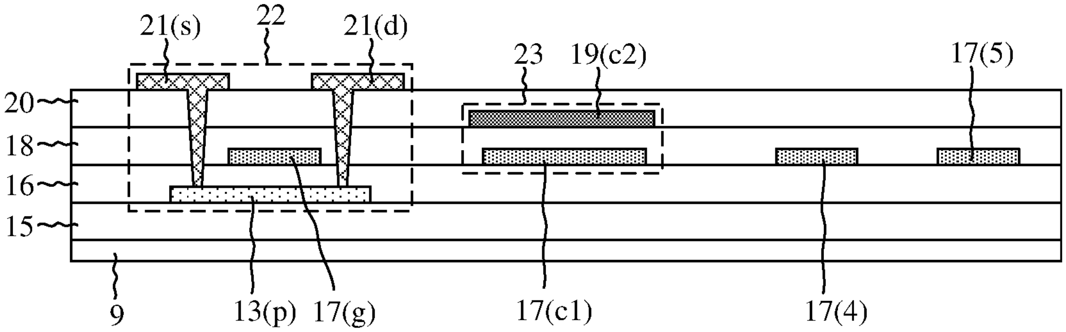
FIG. 11 is a schematic diagram showing layers of a main detection line and an auxiliary detection line according to another embodiment of the present disclosure.

FIG. 11 is a schematic diagram showing layers of a main detection line 4 and an auxiliary detection line 5 according to another embodiment of the present disclosure. Alternatively, in another setting manner, as shown in FIG. 11, the auxiliary detection line 5 and the main detection line 4 are both located in the second metal layer 17.

Figure 12:
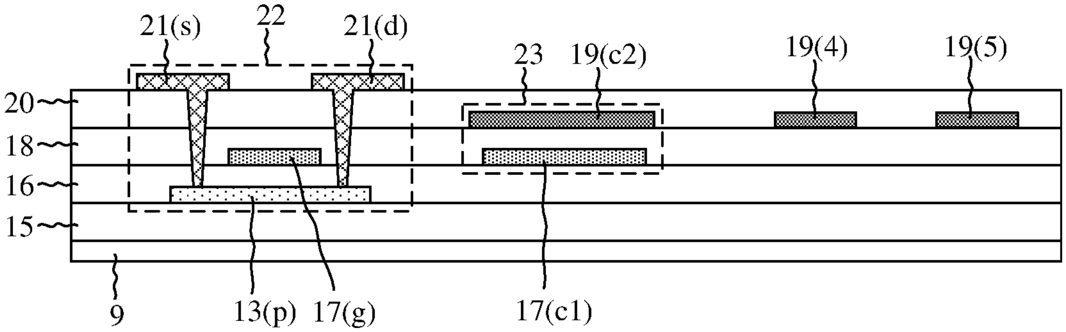
FIG. 12 is a schematic diagram showing layers of a main detection line and an auxiliary detection line according to another embodiment of the present disclosure.

FIG. 12 is a schematic diagram showing layers of a main detection line 4 and an auxiliary detection line 5 according to another embodiment of the present disclosure. Alternatively, in another setting manner, as shown in FIG. 12, the auxiliary detection line 5 and the main detection line 4 are both located in the third metal layer 19.

When the auxiliary detection line 5 is disposed in a layer different from the main detection line 4, in one setting manner, referring to FIG. 9, the auxiliary detection line 5 is located in the first metal layer 14, and the main detection line 4 is located in the third metal layer 19. Alternatively, referring to FIG. 10, the auxiliary detection line 5 is located in the first metal layer 14, and the main detection line 4 is located in the second metal layer 17.

Figure 13:
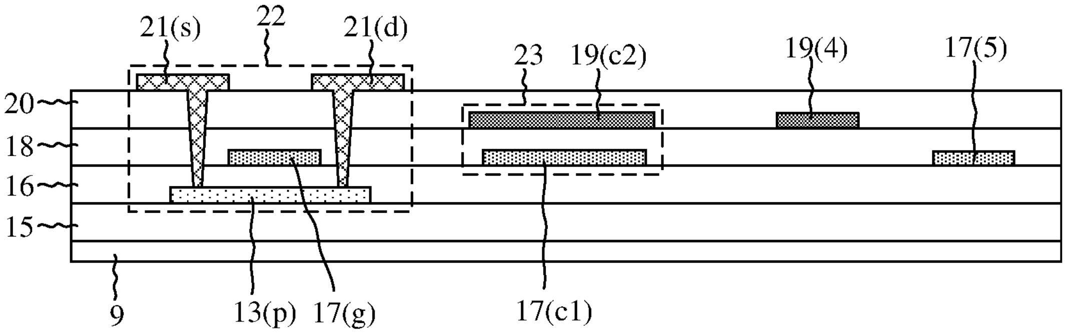
FIG. 13 is a schematic diagram showing layers of a main detection line and an auxiliary detection line according to another embodiment of the present disclosure.

FIG. 13 is a schematic diagram showing layers of a main detection line 4 and an auxiliary detection line 5 according to another embodiment of the present disclosure. Alternatively, in another setting manner, as shown in FIG. 13, the auxiliary detection line 5 is located in the second metal layer 17, and the main detection line 4 is located in the third metal layer 19. At this time, the two metal layers in which the auxiliary detection line 5 and the main detection line 4 are located are adjacent to each other. There is no metal layer or the semiconductor layer 13 between the auxiliary detection line 5 and the main detection line 4. Combined with FIG. 6, at this time, hole depths of the first via 10 and the second via 11 between the auxiliary detection line 5 and the main detection line 4 can be reduced, thereby improving the connection reliability of the auxiliary detection line 5 and the main detection line 4.

In addition, in general, different metal layers may be made of different metal materials. Therefore, when the main detection line 4 is disposed in a layer different from the auxiliary detection line 5, the resistances of the main detection line 4 and the auxiliary detection line 5 can be adjusted by the resistivity of the metal materials of the main detection line 4 and the auxiliary detection line 5.

Figure 14:
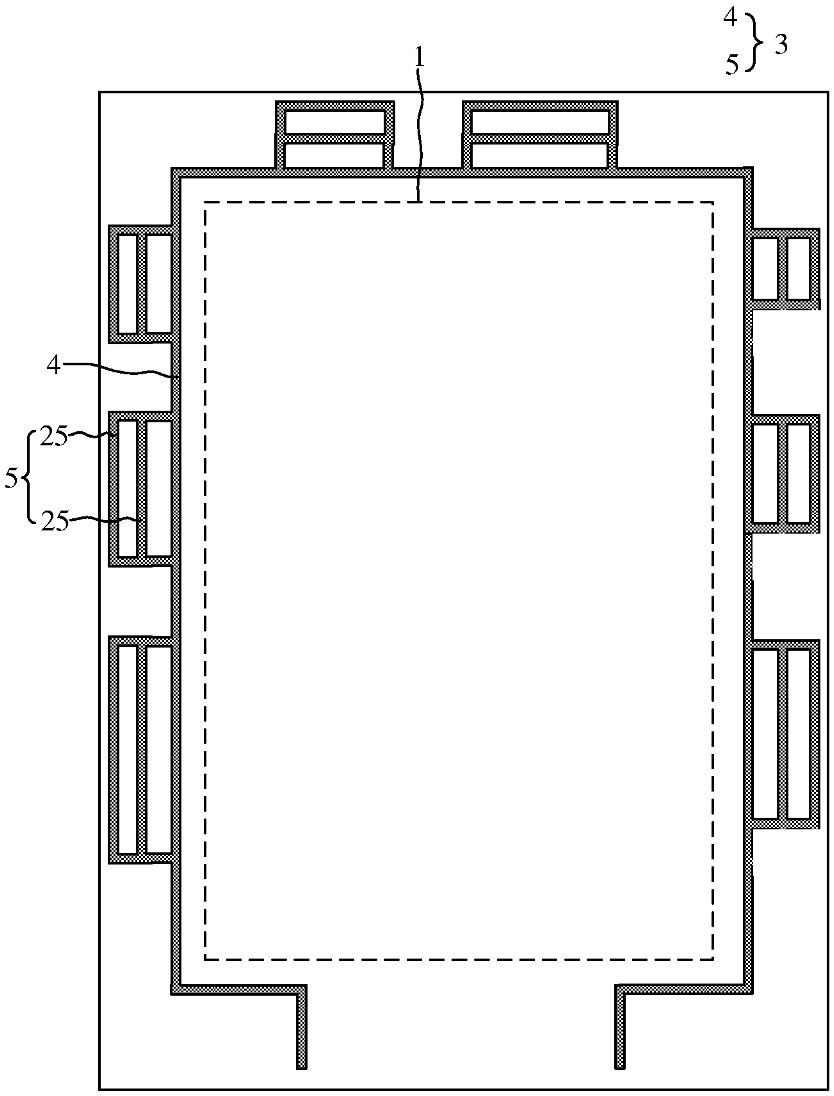
FIG. 14 is a top view of a display panel according to another embodiment of the present disclosure.

FIG. 14 is a top view of a display panel according to another embodiment of the present disclosure. In some embodiments of the present disclosure, as shown in FIG. 14, the auxiliary detection line 5 includes at least two auxiliary sub-lines 25 connected in parallel. A distance between two orthographic projections of two adjacent auxiliary lines 25 onto a plane of the display panel is greater than 0.

In the above setting manner, the auxiliary detection line 5 itself also has a parallel-connection structure. The overall resistances of the auxiliary detection line 5 when none of the auxiliary sub-lines 25 is broken, the overall resistances of the auxiliary detection line 5 when one or more of the auxiliary sub-lines 25 are broken, and the overall resistances of the auxiliary detection line 5 when all auxiliary sub-lines 25 are broken are different, so that the influences on the overall resistance of the crack detection line 3 are also different.

Based on this, in the embodiments of the present disclosure, when the preset resistance of the crack detection line 3 is calculated in advance, the resistances of the crack detection line 3 can be further calculated according to different broken auxiliary sub-lines 25 in each auxiliary detection line 5. When the actual resistance of the crack detection line 3 corresponds to the first preset resistance corresponding to the condition one auxiliary sub-line of a certain auxiliary detection line 5 is broken, it indicates that the generation position of the crack is the position of the auxiliary detection line 5, and the crack extends inward by a short distance, and the crack is far from the display area 1. When the actual resistance of the crack detection line 3 corresponds to the first preset resistance corresponding to the condition two auxiliary sub-lines 25 of a certain auxiliary detection line 5 are broken, it indicates that the generation position of the crack is the position of the auxiliary detection line 5, and the crack extends inward by a larger distance, and the crack is close to the display area 1. In this way, not only the crack generation position can be determined, but also the extending distance of the cracks can be determined, so that more information of the crack can be obtained, and a more complete process analysis can be made.

In addition, it should be noted that the auxiliary sub-lines 25 in the auxiliary detection line 5 can be disposed in a same layer or in different layers. For example, the auxiliary sub-lines 25 in the auxiliary detection line 5 are located in at least two metal layers, and the auxiliary sub-line 25 farthest from the main detection line 4 is closer to the substrate 9.

Figure 15:
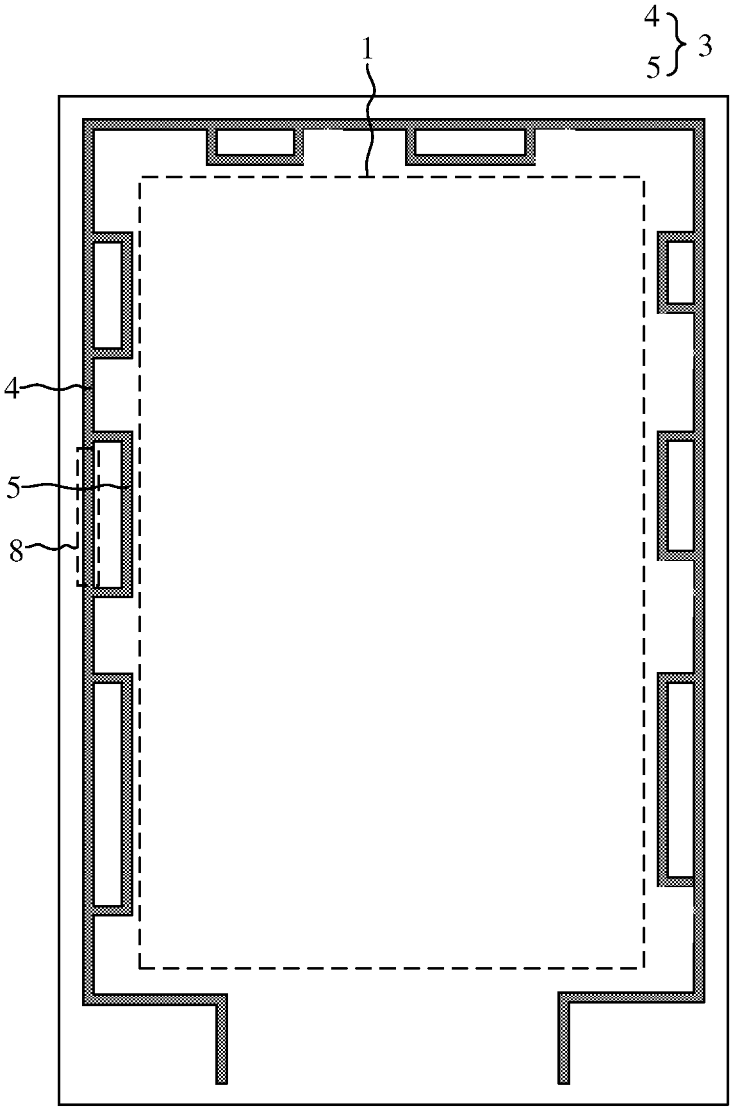
FIG. 15 is a top view of a display panel according to another embodiment of the present disclosure.

FIG. 15 is a top view of a display panel according to another embodiment of the present disclosure. In some embodiments, as shown in FIG. 15, the auxiliary detection line 5 is located at a side of the main detection line 4 adjacent to the display area 1.

Since cracks are mostly generated at an edge of the display panel and extend from the edge to the middle, when the main detection line 4 is located at a side of the auxiliary detection line 5 away from the display area, the main detection line 4 is more likely to be broken due to crack. In other words, the above structure detects the crack generation position based on whether the main segment 8 is broken.

When the crack detection line 3 includes multiple main segments 8, the crack detection line 3 includes multiple auxiliary detection line 5 accordingly.

In a setting manner of the present disclosure, different main segments 8 have different resistances, while different auxiliary detection lines 5 have a same resistance. For example, the main segments 8 are formed by the same patterning process. At this time, different main segments 8 can have the same thickness and the same line width, but have different lengths, so that the resistances of different main segments 8 are different. If different auxiliary detection lines 5 have different lengths, the line widths and/or thicknesses of different auxiliary detection lines 5 can be adjusted to make different auxiliary detection lines 5 have a same resistance. At this time, the influences of the resistances of different main segments 8 on the overall resistance of the crack detection line 3 are different. The crack detection line 3 has different resistances when different main segments 8 are broken.

Alternatively, in another embodiment of the present disclosure, the resistances of different main segments 8 are the same, but the resistances of different auxiliary detection lines are different. For example, different main segments 8 have the same length to achieve the same resistance of different main segments 8, while different auxiliary detection lines 5 have the same length but different line widths and/or different thicknesses to achieve different resistances of different auxiliary detection lines 5. At this time, when a certain main segment 8 is broken, only the auxiliary detection line 5 in a parallel structure is connective in the crack detection line 3, and the auxiliary detection line 5 is considered to be connected in series with other parallel structures. Due to different resistances of different auxiliary detection lines 5, the overall resistance of the crack detection line 3 is different when different parallel structures have a broken main segment 8. That is, when each main segments 8 is broken, the overall resistance of the crack detection line 3 has a unique value different from that when any other main segments 8 is broken.

When the present disclosure calculates a preset resistance of the crack detection line 3 in advance, the first preset resistance can include resistances corresponding to conditions of an i-th auxiliary detection line being broken or resistances corresponding to conditions of any i auxiliary detection lines being broken, where i is 1, 2, . . . , or x, and x is a number of the main segment 8 included in the crack detection line 3. Taking x=3 as an example, the first preset resistance can include: a resistance of the crack detection line 3 when a first main segment 8 is broken, a resistance of the crack detection line 3 when a second main segment 8 is broken, a resistance of the crack detection line 3 when a third main segment 8 is broken, a resistance of the crack detection line 3 when the first main segment 8 and the second main segment 8 are broken, a resistance of the crack detection line 3 when the second main segment 8 and the third main segment 8 are broken, a resistance of the crack detection line 3 when the first main segment 8 and the third main segment 8 are broken, a resistance of the crack detection line 3 when three main segments 8 are broken.

When detecting the cracks, by comparing the actual detected resistance of the crack detection line 3 with the pre-calculated first preset resistance, when the actual resistance matches with one of the first preset resistances, which one or ones of the main segments 8 are broken can be acquired according to the matching result, thereby acquiring the position of crack.

In some embodiments of the present disclosure, the resistances of the auxiliary detection line 5 and the main segment 8 that are paralleled to each other can be the same, but the resistances of different auxiliary detection lines 5 are different from each other. At this time, in the parallel structure composed of the auxiliary detection line 5 and the main segment 8, whether the auxiliary detection line 5 or the main segment 8 is broken, the influence on the overall resistance of the crack detection line 3 is consistent. In this way, the setting location of the auxiliary detection line 5 can be more flexible, e.g., according to the wiring design of the non-display area, some auxiliary detection lines 5 can be disposed at a side of the main detection line 4 adjacent to the display area 1, and other auxiliary detection lines 5 are disposed at a side of the main detection line 4 away from the display area 1.

In some embodiments, referring to FIG. 2 again, the auxiliary detection lines 5 include a first auxiliary detection line 26 and a second auxiliary detection line 27. The first auxiliary detection line 26 and the second auxiliary detection line 27 have different resistances.

Taking a situation where the auxiliary detection line 5 is located at a side of the main detection line 4 away from the display area 1, and the auxiliary detection line 5 is used to determine the crack position as an example, when the first auxiliary detection line 26 and the second auxiliary detection line 27 have different resistances, the resistances of the first auxiliary detection line 26 and the second auxiliary detection line 27 have different influence on the overall resistance of the crack detection line 3. Therefore, when the first preset resistance of the crack detection line 3 is calculated in advance, a first preset resistance when the first auxiliary detection line 26 is broken, a first preset resistance when the second auxiliary detection line 27 is broken, and a first preset resistance when the first auxiliary detection line 26 and the second auxiliary detection line 27 are both broken have significant difference, so that when the actual resistance of the crack detection line 3 is compared with multiple first preset resistances, it can be accurately acquired whether the crack is located at the position of the first auxiliary detection line 26, or at the position of the second auxiliary detection line 27, or at the position of the first auxiliary detection line 26 and the second auxiliary detection line 27.

Further, referring to FIG. 2 again, the lengths of the first auxiliary detection line 26 and the second auxiliary detection line 27 are different, so that when the parameters such as the line width and the thickness are constant, the length difference between the first auxiliary detection line 26 and the second auxiliary detection line 27 can be used to adjust the resistances of the first auxiliary detection line 26 and the second auxiliary detection line 27, and then the first auxiliary detection line 26 and the second auxiliary detection line 27 have different resistances.

Figure 16:
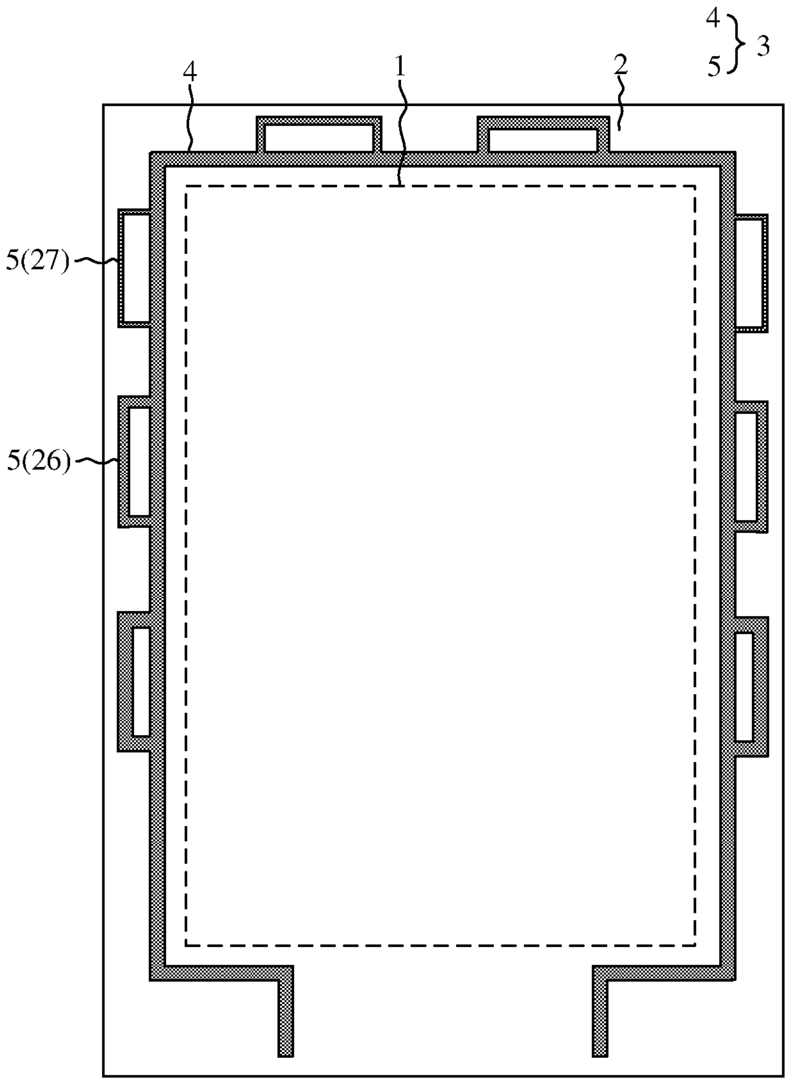
FIG. 16 is a top view of a display panel according to another embodiment of the present disclosure.

FIG. 16 is a top view of a display panel according to another embodiment of the present disclosure. As shown in FIG. 16, the first auxiliary detection line 26 and the second auxiliary detection line 27 have different line widths, so that when parameters such as length and thickness are constant, the line width difference between the first auxiliary detection line 26 and the second auxiliary detection line 27 can be used to adjust the resistances of the first auxiliary detection line 26 and the second auxiliary detection line 27, and then the first auxiliary detection line 26 and the second auxiliary detection line 27 have different resistances.

Figure 17:
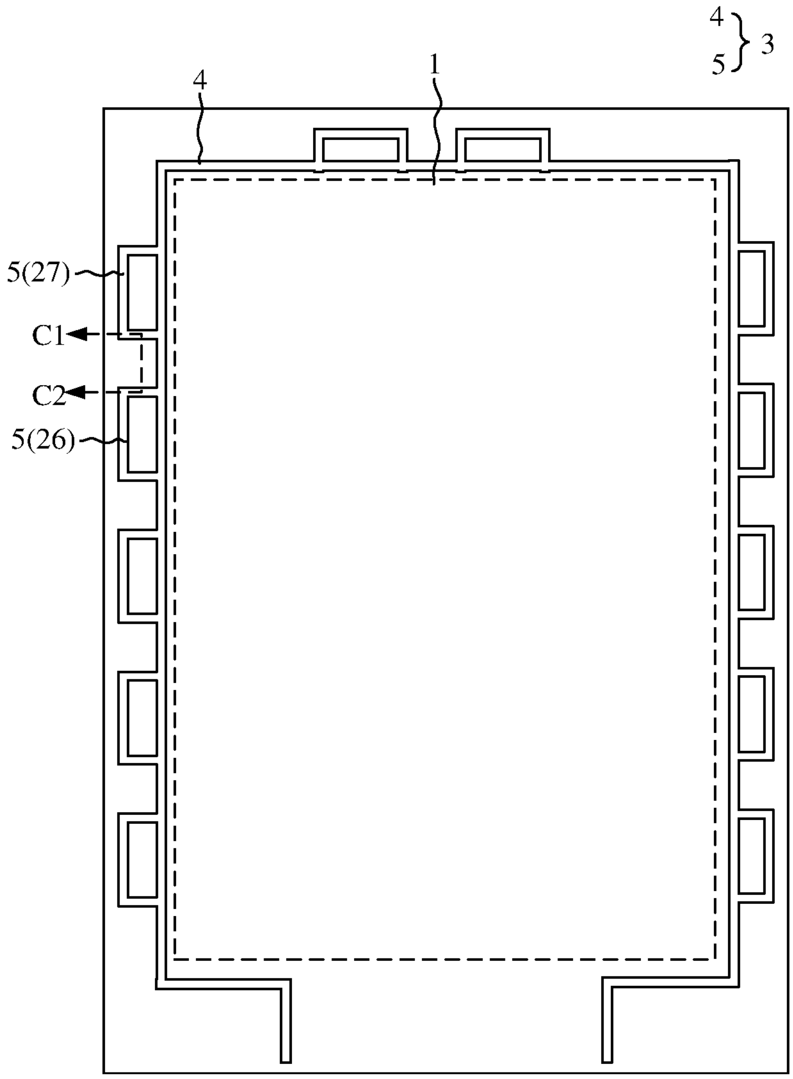
FIG. 17 is a top view of a display panel according to another embodiment of the present disclosure.
Figure 18:
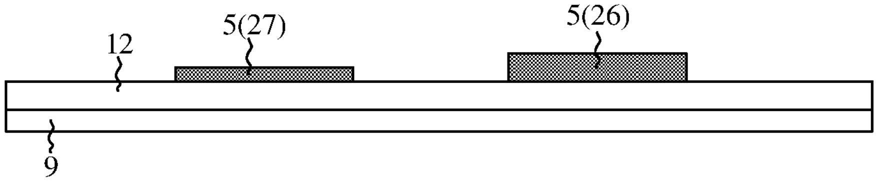
FIG. 18 is a cross-sectional view taken along line C1-C2 shown in FIG. 17 according to an embodiment of the present disclosure.

FIG. 17 is a top view of a display panel according to another embodiment of the present disclosure, and FIG. 18 is a cross-sectional view taken along line C1-C2 shown in FIG. 17 according to an embodiment of the present disclosure. As shown in FIG. 17 and FIG. 18, the first auxiliary detection line 26 and the second auxiliary detection line 27 have different thicknesses, so that when parameters such as length and line width are constant, the thickness difference between the first auxiliary detection line 26 and the second auxiliary detection line 27 can be used to adjust the resistances of the first auxiliary detection line 26 and the second auxiliary detection line 27, and then the first auxiliary detection line 26 and the second auxiliary detection line 27 have different resistances.

In addition, when the line widths and/or thicknesses of the first auxiliary detection line 26 and the second auxiliary detection line 27 are adjusted to make the two have resistance difference, referring to FIG. 17, the first auxiliary detection line 26 and the second auxiliary detection line 27 can have a small length, so that when the length of the main detection line 4 is constant, more auxiliary detection lines 5 can be disposed on the crack detection line 3, thereby further determining the crack generation position more accurately.

Figure 19:
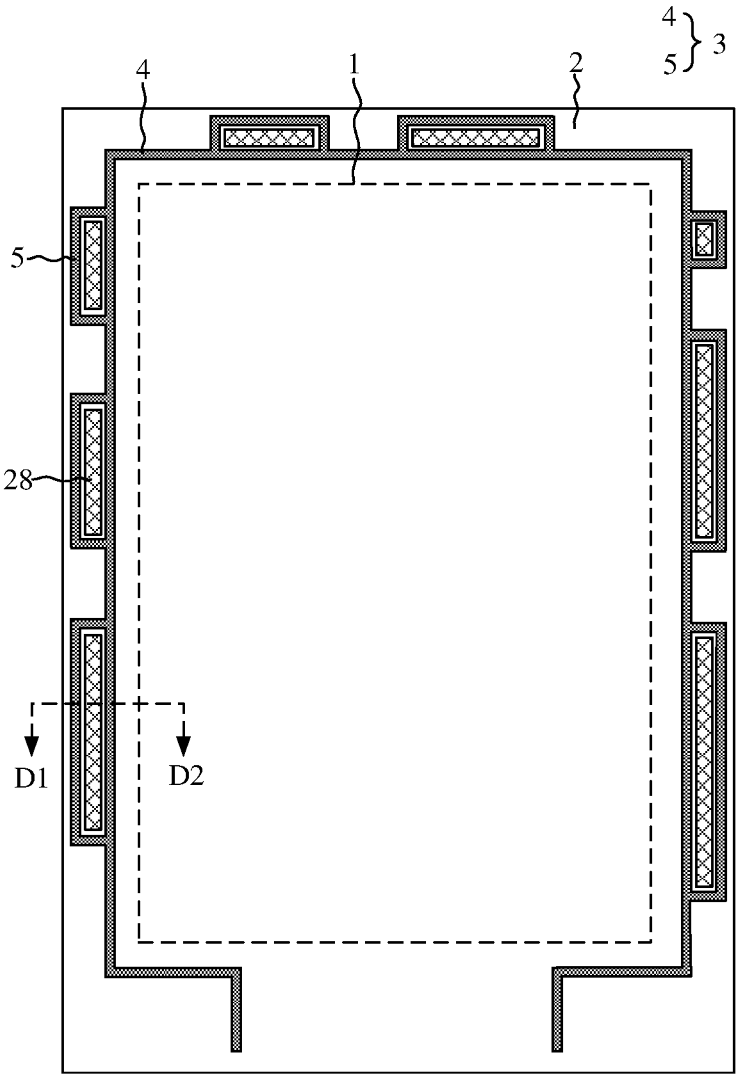
FIG. 19 is a top view of a display panel according to another embodiment of the present disclosure.
Figure 20:
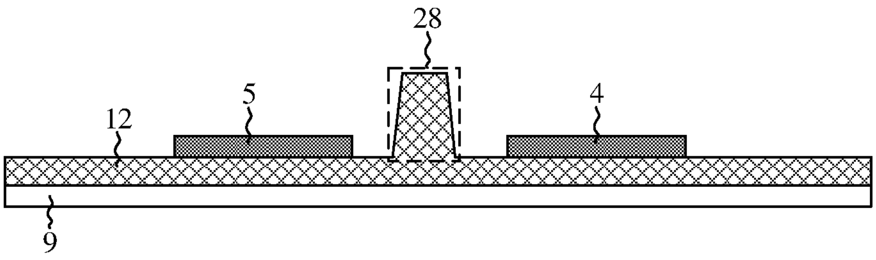
FIG. 20 is a cross-sectional view taken along line D1-D2 shown in FIG. 19 according to an embodiment of the present disclosure.
Figure 21:
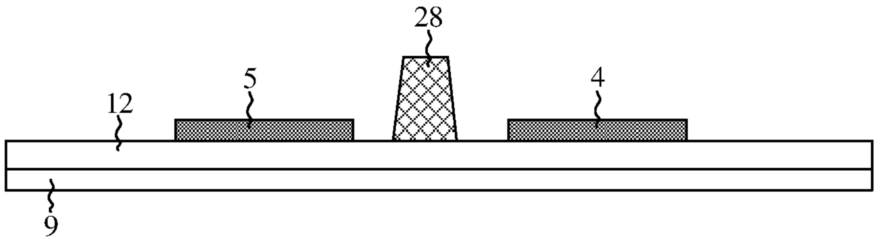
FIG. 21 is a cross-sectional view taken along line D1-D2 shown in FIG. 19 according to another embodiment of the present disclosure.

In some embodiments, as shown in FIG. 19 to FIG. 21, FIG. 19 is a top view of a display panel according to another embodiment of the present disclosure, FIG. 20 is a cross-sectional view taken along line D1-D2 shown in FIG. 19 according to an embodiment of the present disclosure, and FIG. 21 is a cross-sectional view taken along line D1-D2 shown in FIG. 19 according to another embodiment of the present disclosure, the display panel also includes a crack blocking structure 28. Along a direction parallel to a plane of the display panel, the crack blocking structure 28 is located between the auxiliary detection line 5 and the main detection line 4.

In one embodiment, referring to FIG. 20, an insulation layer 12 at a side of the auxiliary detection line 5 and the main detection line 4 adjacent to the substrate 9 is connected with the crack blocking structure 28. In some embodiments, the insulation layer 12 and the crack blocking structure 28 are formed by a same patterning process and by an etching process. Alternatively, in another embodiment, referring to FIG. 21, the crack blocking structure 28 and the insulation layer 12 are independent with each other, and the crack blocking structure 28 can be formed by an additional patterning process.

By disposing the crack blocking structure 28 between the auxiliary detection line 5 and the main detection line 4, when there is a crack in the display panel, the crack blocking structure 28 can not only effectively prevent the crack from extending into the display area 1, but also reduce a risk of simultaneous breakage of the auxiliary detection line 5 and the main detection line 4, thereby improving the reliability of crack detection.

Further, the crack blocking structure 28 can include an inorganic material, so that the crack blocking structure 28 has a better blocking crack effect.

In some embodiments, referring to FIG. 2, the crack detection line 3 includes multiple auxiliary detection line 5 that are arranged at intervals along an extending direction of the main detection line 4, and a distance d between two adjacent auxiliary detection lines 5 along its arrangement direction is greater than or equal to 2 μm, so that the contact connection between adjacent auxiliary detection lines 5 due to process accuracy and other reasons, thereby improving the accuracy of crack position detection.

Figure 22:
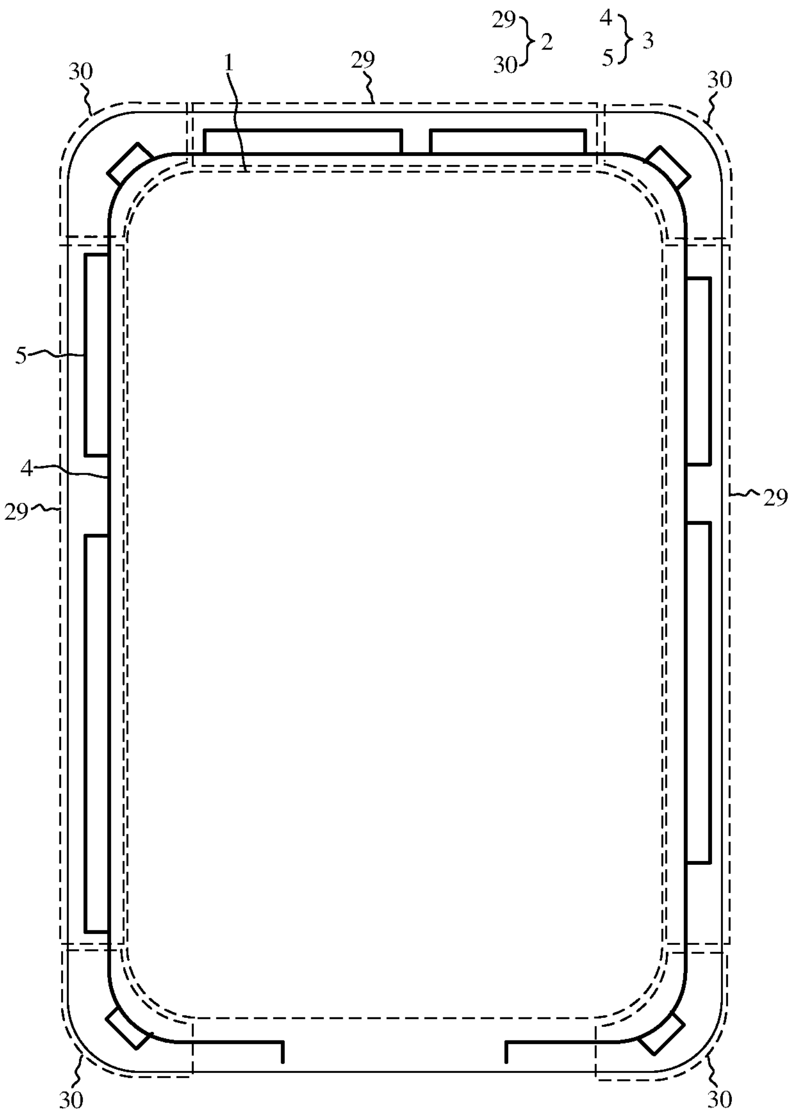
FIG. 22 is a top view of a display panel according to another embodiment of the present disclosure.

In some embodiments, as shown in FIG. 22, FIG. 22 is a top view of a display panel according to another embodiment of the present disclosure, the non-display area 2 includes a straight area 29 and a corner area 30 that are communicated with each other. Part of the auxiliary detection lines is located in the corner area 30.

During performing processes such as a 3D bonding process of the display panel, the corner area 30 is more likely to have uneven stress changes than the straight area 29, and therefore the corner area 30 is more likely to generate cracks. In this regard, in this embodiment, by further disposing the auxiliary detection line 5 in the corner area 30, it is possible to detect whether cracks are generated in the corner area 30 and detect the position of the cracks, so that it is conductive to confirm the process capability of the corner area 30 and perform the subsequent process analysis, thereby optimizing the performance of the corner area 30.

Further, FIG. 23 is a partial schematic diagram of a display panel according to an embodiment of the present disclosure. The auxiliary detection line 5 includes first-type auxiliary detection lines 31 located in the straight area 29 and second-type auxiliary detection lines 32 located in the corner area 30. In the straight area 29, at least two first-type auxiliary detection lines 32 are arranged at intervals along an extending direction of the main detection line 4. In the corner area 30, at least two second-type auxiliary detection lines 32 are arranged at intervals along the extending direction of the main detection line 4. A minimum distance h1 between two adjacent second-type auxiliary detection lines 32 along their arranging direction is smaller than a minimum distance h2 between two adjacent first-type auxiliary detection lines 31 along their arranging direction.

Generally, the number of metal wirings in the corner area 30 is large, for example, a large number of fan-out wirings are disposed in the corner area 30 at a lower frame. Therefore, if the corner area 30 generates cracks, more metal wirings will break. In this regard, in this embodiment, by further arranging the auxiliary detection line 5 in the corner area 30 more densely, it is possible to detect crack generation position in the corner area 30 more accurately, so that it is conductive to make a more comprehensive process analysis for the corner area 30 subsequently.

Based on a same inventive concept, the present disclosure further provides a method for detecting a crack of a display panel. Referring to FIG. 1 and FIG. 2, the display panel includes a display area 1 and a non-display area 2. The non-display area 2 includes crack detection lines 3. The crack detection line 3 includes a main detection line 4 and at least one auxiliary detection line 5. The main detection line 4 surrounds the display area 1. The auxiliary detection line 5 includes a first end 6 and a second end 7. The first end 6 and the second end 7 are both connected to the main detection line 4.

FIG. 24 is a flow chart of the crack detection method according to an embodiment of the present disclosure. As shown in FIG. 24, the crack detection method includes:

Block S1: a first preset resistance is acquired. The first preset resistance is a resistance of the crack detection line 3 when the auxiliary detection line 5 or a main segment 8 is broken, where the main segment 8 is a portion of the main detection line 4 connected in parallel to the auxiliary detection line 5.

Block S2: an actual resistance of the crack detection line 3 is measured and whether the actual resistance corresponds to the first preset resistance is determined. If the actual resistance corresponds to the first preset resistance, the display panel has a crack, and the crack located on the at least one auxiliary detection line 5 or the main detection line 8.

Combined with the above analysis, in the crack detection method provided by the embodiments of the present disclosure, when the crack detection is performed, by comparing the detected actual resistance of the crack detection line 3 with the first preset resistance of the crack detection line 3, whether the auxiliary detection line 5 or the main segment 8 is broken can be determined. If breakage is determined, the position of the auxiliary detection line 5 or the main segment 8 is crack generation position. In this way, accurate determination of the crack generation position is achieved, thereby achieving accurate determination of the crack generation position. In this way, process capability and subsequent process analysis can be confirmed based on the crack generation position, which is conductive to improving and repairing the display panel.

In some embodiments, combined with FIG. 2, the crack detection line 3 includes x auxiliary detection lines 5 that are located at a side of the main detection line 4 away from the display region 1. The resistances of the x auxiliary detection lines 5 may be different from each another.

The first preset resistance includes resistances corresponding to conditions of an i-th auxiliary detection line being broken or resistances corresponding to conditions of any i auxiliary detection lines being broken, where i is 1, 2, . . . , or x.

In the above detection method, based on whether the auxiliary detection line 5 is broken, the crack generation position is detected. Taking x=3 as an example, the first preset resistance can include: a resistance of the crack detection line 3 when a first auxiliary detection line 5 is broken, a resistance of the crack detection line 3 when a second auxiliary detection line is broken, a resistance of the crack detection line 3 when a third auxiliary detection line 5 is broken, a resistance of the crack detection line 3 when the first auxiliary detection line 5 and the second auxiliary detection line 5 are broken, a resistance of the crack detection line 3 when the second auxiliary detection line 5 and the third auxiliary detection line 5 are broken, a resistance of the crack detection line 3 when the first auxiliary detection line 5 and the third auxiliary detection line 5 are broken, and a resistance of the crack detection line 3 when three auxiliary detection lines 5 are broken.

In the above manner, the resistance of the crack detection line 3 corresponding to various conditions any one or ones of the auxiliary detection lines 5 are broken is calculated in advance. Even if multiple auxiliary detection lines 5 are broken due to multiple cracks present in the display panel, one of the multiple first preset resistances can be matched with the actual resistance, so that the breakage situation of the auxiliary detection line 5 can be acquired according to the first preset resistance, and the number of cracks and the crack generation position can be obtained.

Figure 25:
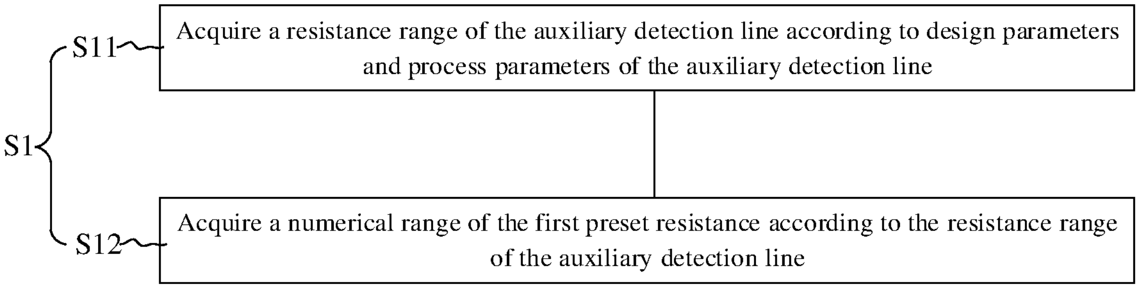
FIG. 25 is a flow chart of a crack detection method according to another embodiment of the present disclosure.

Further, as shown in FIG. 25, FIG. 25 is a flow chart of a crack detection method according to another embodiment of the present disclosure, the method can include following steps.

Block S11: a resistance range of the auxiliary detection line 5 is acquired according to design parameters and process parameters of the auxiliary detection line 5. The design parameters can include theoretical design parameters such as thickness, line width, length, etc. of the auxiliary detection line 5, and the process parameters can include process accuracy, such as alignment error, and other parameters.

Block S12: a numerical range of the first preset resistance is acquired according to the resistance range of the at least one auxiliary detection line 5.

In the manufacturing process of the auxiliary detection line 5, the actual values of the line width and thickness of the auxiliary detection line 5 can differ from their theoretical design values due to influences such as process accuracy, which in turn leads to differences between the actual resistance of the auxiliary detection line 5 and the theoretical design resistance. In this regard, in the embodiments of the present disclosure, a possible numerical range of the resistance of the auxiliary detection line 5 is calculated by according to the design parameters and process parameters of the auxiliary detection line 5. Therefore, the first preset resistance is a numerical range according to the above range. When the actual resistance detected subsequently is within the numerical range of the first preset resistance, it can be determined that the actual resistance matches the first preset resistance, thereby reducing a risk of the actual resistance not matching the first preset resistance due to process errors and other factors.

Further, referring to FIG. 2, the auxiliary detection lines 5 include a first auxiliary detection line 26 and a second auxiliary detection line 27.

When the first auxiliary detection line 26 is broken, the numerical range of the first preset resistance has a minimum value of r1 and a maximum value of r2. When the second auxiliary detection line 27 is broken, the numerical range of the first preset resistance has a minimum value of r3 and a maximum value of r4. When the first auxiliary detection line 26 and the second auxiliary detection line 27 are both broken, the numerical range of the first preset resistance has a minimum value of r5 and a maximum value of r6. Where, r1>r4 and r5>r2.

That is, the first preset resistance ranges from r1 to r2 when the first auxiliary detection line 26 is broken, the first preset resistance ranges from r3 to r4 when the second auxiliary detection line 27 is broken, and the first preset resistance ranges from r5 to r6 when both the first auxiliary detection line 26 and the second auxiliary detection line 27 are broken. By setting r1>r4 and r5>r2, any two of the three value ranges of r1~r2, r3~r4 and r5~r6 have no overlapping. Further, making the actual resistance at most locate within one numerical range of the first preset resistance can avoid a situation where the actual resistance matches two numerical ranges of the first preset resistance.

In an embodiment, referring to FIG. 15, the crack detection line 3 includes x auxiliary detection lines 5 located on a side of the main detection line 4 adjacent to the display area 1. The resistances of the x auxiliary detection lines 5 can be different from one another.

Accordingly, the first preset resistance includes resistances corresponding to conditions of an i-th auxiliary detection line being broken or resistances corresponding to conditions of any i auxiliary detection lines being broken, where i is 1, 2, . . . , or x.

Based on whether the main segment 8 is broken, the crack generation position is detected by the above detection method. Taking x=3 as an example, the first preset resistance can include: a resistance of the crack detection line 3 when a first main segment 8 is broken, a resistance of the crack detection line 3 when a second main segment 8 is broken, a resistance of the crack detection line 3 when a third main segment 8 is broken, a resistance of the crack detection line 3 when the first main segment 8 and the second main segment 8 are broken, a resistance of the crack detection line 3 when the first main segment 8 and the third main segment 8 are broken, a resistance of the crack detection line 3 when the second main segment 8 and the third main segment 8 are broken, a resistance of the crack detection line 3 when three main segments 8 are broken.

In the above manner, the resistances, corresponding to the conditions any one or more of the main segments 8 are broken, of the crack detection line 3 are calculated in advance, so that even if multiple main segments 8 are broken due to multiple cracks in the display panel, one of the multiple first preset resistances can be matched with the actual resistance, so that the breakage situation of the auxiliary detection line 5 can be acquired according to the first preset resistance and the measured resistance vale, and the number of cracks and the crack generation position can be obtained accordingly.

In an embodiment, the crack detection method further includes: acquiring a second preset resistance, where the second preset resistance is a resistance of the crack detection line when none of the at least one auxiliary detection line 5 and the main segment 8 is broken; detecting an actual resistance of the crack detection line 3 and determining whether the actual resistance is matched with the second preset resistance; and if the actual resistance is matched with the second preset resistance, determining that the display panel has no crack.

By obtaining the second preset resistance and comparing the actual resistance and the second preset resistance, a situation that none of the auxiliary detection line 5 and the main segment 8 is broken can be identified, so that the detection results of the crack are more comprehensive.

It should be noted that in some embodiments of the present disclosure, the second preset resistance is also a numerical range. For example, the resistance range of the auxiliary detection line 5 can be obtained according to the design parameters and process parameters of the auxiliary detection line 5, so that the numerical range of the second preset resistance is obtained according to the resistance range of the auxiliary detection line 5.

Further, the numerical range of the second preset resistance does not overlap with any numerical range of the first preset resistance. For example, the numerical range of the second preset resistance has a minimum value of r7 and a maximum value of r8, so that r3>r8, and the four numerical ranges of r1-r2, r3-r4, r5-r6, and r7-r8 have no overlapping range among one another.

Figure 26:
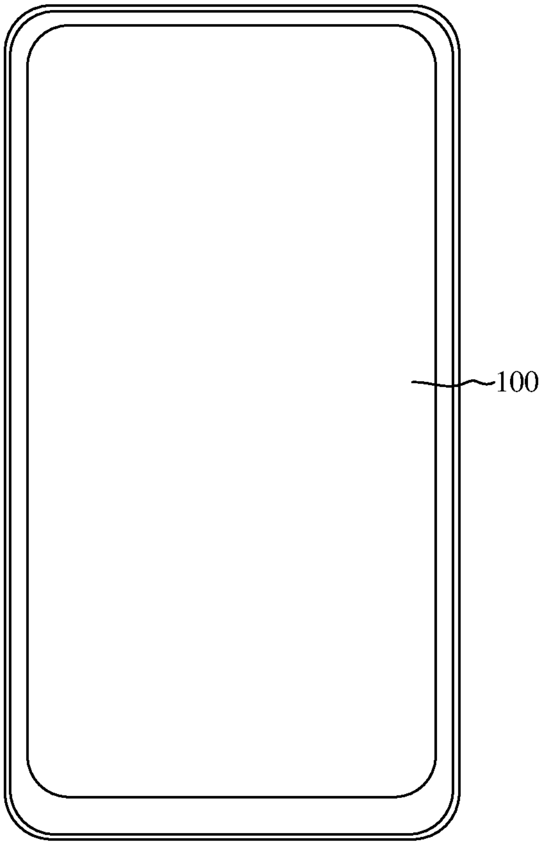
FIG. 26 is a structural diagram of a display apparatus according to an embodiment of the present disclosure.

Based on a same inventive concept, the present disclosure further provides a display apparatus. FIG. 26 is a structural diagram of a display apparatus according to an embodiment of the present disclosure. As shown in FIG. 26, the display apparatus includes a display panel 100 mentioned above. The specific structure of the display panel 100 has been described in detail in the above embodiments, and it will not be elaborated here. The display apparatus shown in FIG. 26 is just schematically described. The display apparatus can be an electronic device having a display function, such as a mobile phone, a tablet computer, a laptop computer, an e-paper book, or a television.

The above are merely some embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

We claim:

1. A display panel comprising:

a crack detection line located in a non-display area of the display panel, wherein the non-display area surrounds a display area of the display panel;

wherein the crack detection line comprises a main detection line and at least one auxiliary detection line, and each of the at least one auxiliary detection line comprises a first end and a second end each being connected to the main detection line, wherein the non-display area comprises a straight area and a corner area that are communicated with each other, the main detection line comprises a straight segment located in the straight area and a curved segment located in the corner area, the at least one auxiliary detection line comprises first-type auxiliary detection lines and second-type auxiliary detection lines, the first-type auxiliary detection lines are located in the straight area and connected in parallel with the straight segment of the main detection line, and the second-type auxiliary detection lines are located in the corner area and connected in parallel with the curved segment of the main detection line, and wherein in the straight area, at least two first-type auxiliary detection lines of the first-type auxiliary detection lines are arranged at intervals along an extending direction of the main detection line;

in the corner area, at least two second-type auxiliary detection lines of the second-type auxiliary detection lines are arranged at the intervals along the extending direction of the main detection line; and a minimum distance between two adjacent ones of the second-type auxiliary detection lines along an arranging direction of the two adjacent second-type auxiliary detection lines is smaller than a minimum distance between two adjacent ones of the first-type auxiliary detection lines along an arranging direction of the two adjacent first-type auxiliary detection lines.

2. The display panel according to claim 1, wherein the at least one auxiliary detection line is located at a side of the main detection line away from the display area.

3. The display panel according to claim 2, wherein a line width of each of the at least one auxiliary detection line is smaller than or equal to a line width of the main detection line.

4. The display panel according to claim 2, further comprising a substrate, wherein along a direction perpendicular to a plane of the substrate, a distance between one of the at least one auxiliary detection line and the substrate is smaller than or equal to a distance between the main detection line and the substrate.

5. The display panel according to claim 4, further comprising a semiconductor layer and a first metal layer, wherein the first metal layer is located between the semiconductor layer and the substrate, and the at least one auxiliary detection line is located in the first metal layer.

6. The display panel according to claim 2, wherein each of the at least one auxiliary detection line comprises at least two auxiliary sub-lines connected in parallel.

7. The display panel according to claim 1, wherein the at least one auxiliary detection line is located at a side of the main detection line adjacent to the display area.

8. The display panel according to claim 1, wherein the first-type auxiliary detection lines comprise a first auxiliary detection line and a second auxiliary detection line, and the first auxiliary detection line has a resistance different from the second auxiliary detection line.

9. The display panel according to the claim 8, wherein the first auxiliary detection line and the second auxiliary detection line are different in at least one of length, line width or thickness.

10. The display panel according to claim 1, further comprising a crack blocking structure, wherein along a direction perpendicular to a plane of the display panel, the crack blocking structure is located between the at least one auxiliary detection line and the main detection line.

11. The display panel according to the claim 10, wherein the crack blocking structure comprises an inorganic material.

12. The display panel according to claim 1, wherein the first-type auxiliary detection lines comprise at least two first-type auxiliary detection lines arranged at intervals along an extending direction of the main detection line, and a distance between two adjacent ones of the auxiliary detection lines is greater than or equal to 2 μm.

13. A display panel, comprising:

a substrate having a display area and a non-display area surrounding the display are;

a first metal layer on the substrate;

a buffer layer on the first metal layer;

a crack detection line and located in the non-display area;

a transistor located in the display area and comprising a gate electrode, a first electrode, a second electrode, and an active layer; and a second metal layer, wherein the crack detection line comprises a main detection line and an auxiliary detection line, the auxiliary detection line is connected in parallel with a part of the main detection line, and at least one of the main detection line or the auxiliary detection line is formed in the first metal layer, the active layer of the transistor is above the buffer layer, the gate electrode of the transistor is formed in the second metal layer, the second metal layer and the active layer are separated by a gate insulation layer, and the first electrode and the second electrode are formed in a layer that is above and separated from the second metal layer, and wherein the auxiliary detection line is formed in the first metal layer, and the main detection line is formed in the second metal layer.

14. The display panel according to claim 13, wherein both the main detection line and the auxiliary detection line are formed in the first metal layer.

15. A display panel, comprising:

a substrate having a display area and a non-display area surrounding the display are;

a first metal layer on the substrate;

a buffer layer on the first metal layer;

a crack detection line and located in the non-display area;

a transistor located in the display area and comprising a gate electrode, a first electrode, a second electrode, and an active layer;

a second metal layer; and a third metal layer, wherein the crack detection line comprises a main detection line and an auxiliary detection line, the auxiliary detection line is connected in parallel with a part of the main detection line, and at least one of the main detection line or the auxiliary detection line is formed in the first metal layer, the active layer of the transistor is above the buffer layer, the gate electrode of the transistor is formed in the second metal layer, the second metal layer and the active layer are separated by a gate insulation layer, and the first electrode and the second electrode are formed in a layer that is above and separated from the second metal layer, and the auxiliary detection line is formed in the first metal layer, the main detection line is formed in the third metal layer, the layer where the first electrode and the second electrode are formed is a fourth metal layer, and the third metal layer is located between the second metal layer and the fourth metal layer and is separated from the second metal layer and the fourth metal layer by insulation layers respectively.

* * * * *